US008655100B2

United States Patent
Gaubatz et al.

(10) Patent No.: US 8,655,100 B2
(45) Date of Patent: Feb. 18, 2014

(54) CORRECTING AN ARTIFACT IN AN IMAGE

(75) Inventors: Matthew Gaubatz, Ithaca, NY (US); Boris Oicherman, Kiryat Tivon (IL)

(73) Assignee: Hewlett-Packard Development Company, L.P., Houston, TX (US)

( * ) Notice: Subject to any disclaimer, the term of this patent is extended or adjusted under 35 U.S.C. 154(b) by 228 days.

(21) Appl. No.: 13/260,292

(22) PCT Filed: Jan. 29, 2010

(86) PCT No.: PCT/US2010/022490
§ 371 (c)(1),
(2), (4) Date: Sep. 24, 2011

(87) PCT Pub. No.: WO2011/093864
PCT Pub. Date: Aug. 4, 2011

(65) Prior Publication Data
US 2012/0020557 A1  Jan. 26, 2012

(51) Int. Cl.
*G06K 9/40* (2006.01)
*G06K 9/00* (2006.01)

(52) U.S. Cl.
USPC .......................................... 382/275; 382/167

(58) Field of Classification Search
USPC ......... 382/275, 274, 266, 167, 279; 358/3.26, 358/3.27; 348/241–252; 345/611
See application file for complete search history.

(56) References Cited

U.S. PATENT DOCUMENTS

| | | | |
|---|---|---|---|
| 7,830,418 B2 | 11/2010 | Ulichney et al. | |
| 8,200,028 B2 * | 6/2012 | Gabso et al. | 382/232 |
| 2002/0141640 A1 | 10/2002 | Kraft | |
| 2011/0002506 A1 * | 1/2011 | Ciuc et al. | 382/103 |

FOREIGN PATENT DOCUMENTS

JP 2005-310068 11/2005

OTHER PUBLICATIONS

International Search Report and Written Opinion dated Sep. 29, 2010 issued on PCT Patent Application No. PCT/US2010/022490 flied on Jan. 29, 2010.
J. Willamowski, and G. Csurka, "Probabilistic automatic red eye detection and correction," proc. IEEE ICPR 2006, vol. 3, pp. 762-765.
M. Gaudatz and R. Ulichney, "Automatic red-eye detection and correction," prod. IEEE. ICIP 2002, vol. 1, pp. 804-807.
P. Huang, Y. Chien and S. Lai, "Automatic multi-layer red-eye detection," proc. IEEE ICIP 2006, pp. 2013-2016.
R. Ulichney and M. Gauhatz, "Perceptual-Based Correction of Photo Red-Eye", Proc. of the 7th IASTED International Conf. on Signal and image Processing, 2005.
H. Luo et al., "An efficient automatic redeye detection and correction algorithm," Procs. of IEEE ICPR 2004, vol. 2, pp. 883-886, year 2004.

* cited by examiner

*Primary Examiner* — Yon Couso

(57) ABSTRACT

A method of correcting an artifact in a captured image includes generating a binary map that corresponds to the artifact in the captured image. The method also includes generating a luminance mask from the binary map, the luminance mask applying a level of correction near an edge of the artifact that is different from a level of correction applied at the center of the artifact and generating, a chrominance mask to correct a color of the artifact. The method further includes performing corrections to pixels according to the luminance and the chrominance masks.

15 Claims, 4 Drawing Sheets

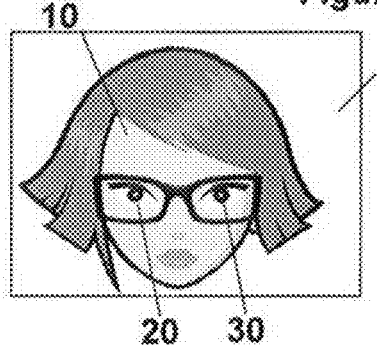
*Figure 1*
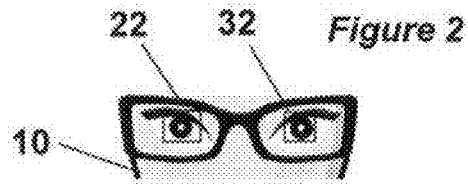
*Figure 2*
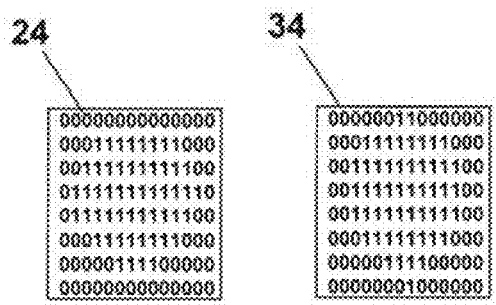
*Figure 3*
*Figure 4*
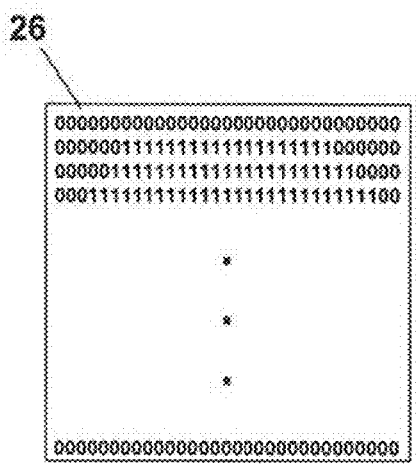

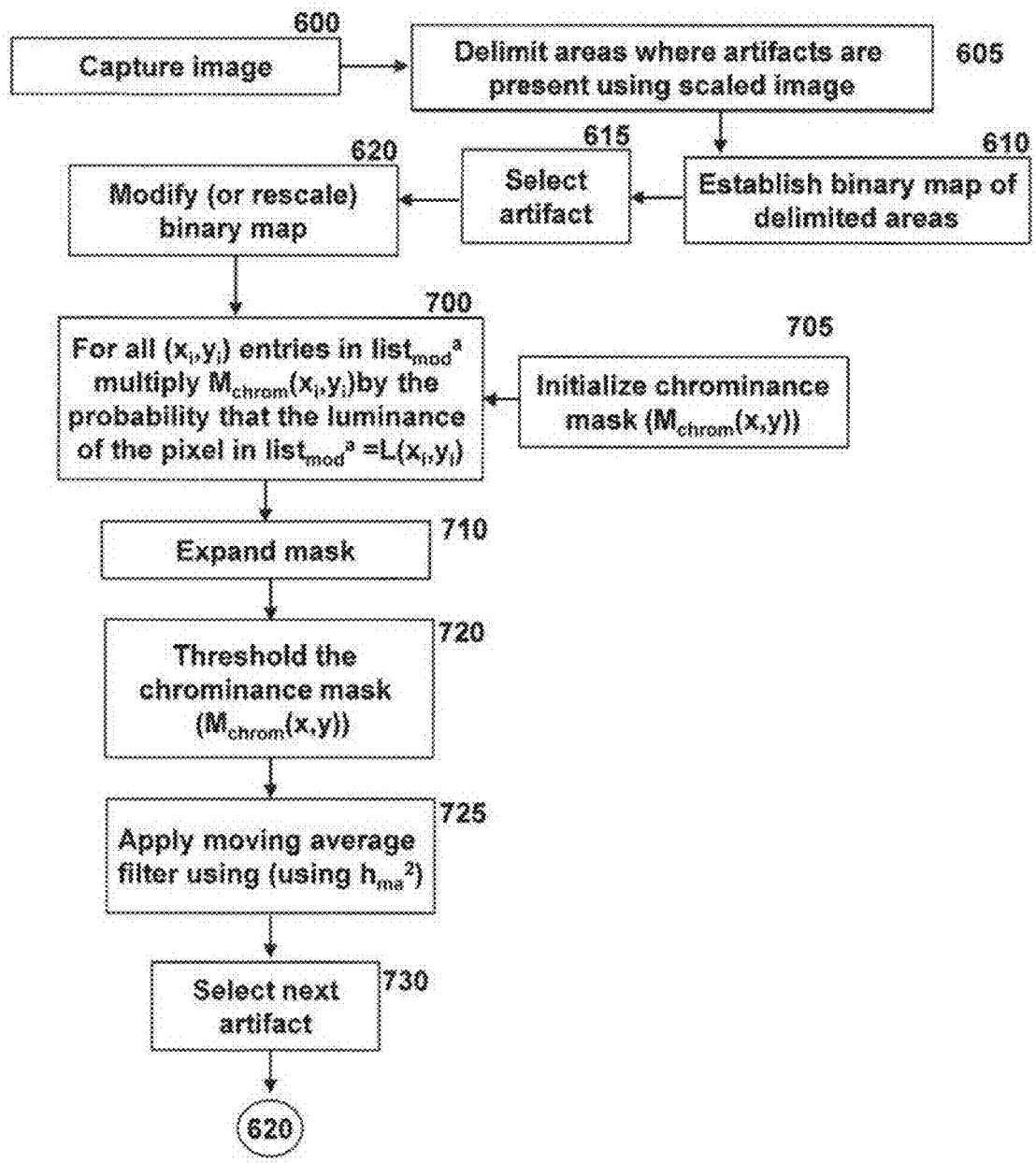

CORRECTING AN ARTIFACT IN AN IMAGE

BACKGROUND

In an online photo sharing and printing service, customers may be presented with the option of purchasing images uploaded by the customer and stored by the photo sharing and printing service. This allows the customer to store a large number of images and purchase high-quality versions of only those images that he or she determines are worth the printing and shipping costs. These online services may allow a customer to upload and store a virtually unlimited number of photos while providing the customer with the ability to purchase printed images perhaps years after the images were captured and uploaded to the service's web site.

Often, the online photographic images are stored and displayed to the customer using a level of resolution that is lower than the level of resolution provided in the finished print that is delivered to the customer. Further, in many online photo sharing and printing services, red-eye and other artifact correction may be applied to a much smaller version (perhaps even a thumbnail version) of the images displayed to the customer by way of the service's web site. This allows the service to economize on the memory and image processing resources needed to detect red-eye by performing such detection on minimal representations of the images, and then to perform sophisticated red-eye correction techniques on only those photographs selected for printing and purchase by the customer. However, although this might be advantageous for the online photo sharing and printing service, the approach may have certain drawbacks for the customer.

When the customer makes his or her purchasing decision while interacting with the photo sharing and printing service's web site, the decision is made based on the version of the image presented. However, when the customer receives the printed photograph, the photograph may not be a faithful representation of the image presented when the purchasing decision was made. Accordingly, when the customer receives the printed image, he or she may feel disappointed in the quality of the purchased image.

BRIEF DESCRIPTION OF THE DRAWINGS

FIG. 1 shows a representation of a woman's face, while

FIG. 2 shows a portion of the face in which red-eye artifacts have been delimited by square boxes according to an embodiment of the invention.

FIG. 3 represents the binary maps showing the pixels within the boxes shown in FIG. 2 that are in need of correction according to an embodiment of the invention.

FIG. 4 shows the result of modifying or rescaling the binary map of FIG. 3 to encompass a much larger number of pixels according to an embodiment of the invention.

FIG. 7 is a flow chart for a method that summarizes the development of the chrominance mask according to an embodiment of the invention.

DESCRIPTION OF THE EMBODIMENTS

Figure 5:
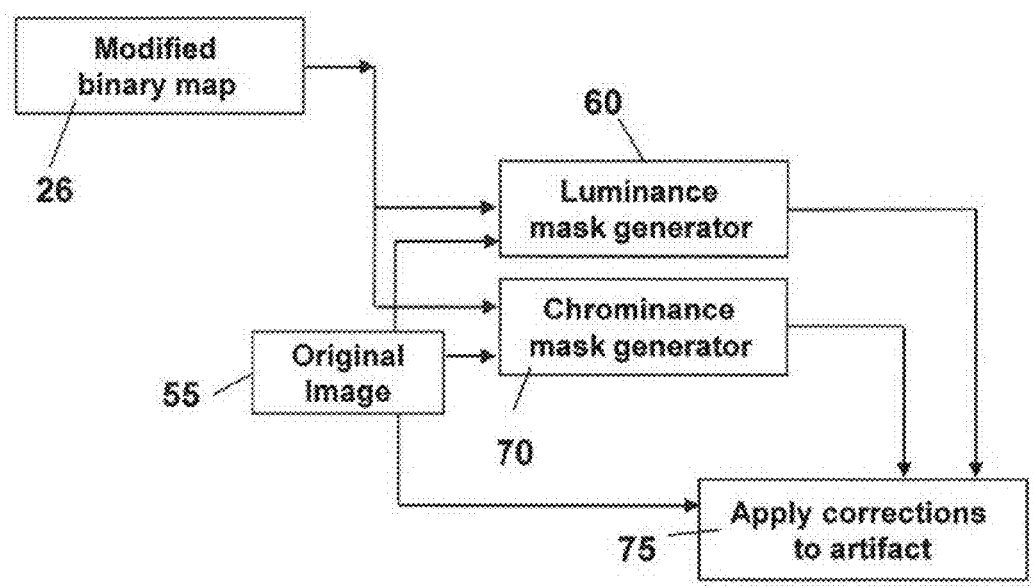
FIG. 5 is a top-level functional block diagram for generating a luminance mask beginning with the modified binary map shown in FIG. 4 according to an embodiment of the invention.

The embodiments of the invention described herein provide a method for correcting red-eye using multivariate statistical models, thresholding, and other operations. The result is a high-quality image in which red-eye and other artifacts are removed from the image without affecting the surrounding areas of the face that do not require correction. Embodiments of the invention can make use of lower-resolution images (such as thumbnails) to detect red-eye artifacts. The detected artifact information is used to guide red-eye correction that is then applied to a higher-resolution version of the image. Thus, the resulting higher-resolution version of the image that is printed and delivered to the customer is more likely to meet the customer's quality expectations.

FIG. 1 shows a representation of a digital image of a woman's face according to an embodiment of the invention. In FIG. 1, image 5 depicts a woman's face (10) having red-eye artifacts 20 and 30. In general, the closer the face is to the camera that captures the image, the more distinct the red-eye effect appears. In the embodiment of FIG. 1, it has been assumed that the woman's face is close enough to the camera so as to produce pronounced red-eye artifacts in the captured image.

FIG. 2 shows a portion of the woman's face of FIG. 1 in which red-eye artifacts have been delimited by boxes 22 and 32 according to an embodiment of the invention. Within each of boxes 22 and 32, at least some, but not all, of the pixels are in need of correction. As can be seen, some portions of boxes 22 and 32 encompass the white portion of the woman's eyes, and it is not likely that these pixels are in need of correction. The inventors contemplate that FIG. 2 is a fairly low-resolution version of the digital image represented in FIG. 1, perhaps even a thumbnail.

FIG. 3 represents the binary maps showing the pixels within boxes 22 and 32 from FIG. 2 that are in need of correction according to an embodiment of the invention. In FIG. 3, each 0 or 1 entry of binary map 24 corresponds to the location of the pixels contained within box 22, while each 0 or 1 entry of binary map 34 corresponds to the location of the pixels contained within box 32. By convention, those pixels that do not need correction have been identified with a 0 in the associated binary map, while those pixels that need correction have been identified with a 1 in the associated binary map. This can be seen intuitively in both binary maps 24 and 34, in which the pixels corresponding to the edges of each of boxes 22 and 32 are identified with a 0 (corresponding to a whiter portion of the eye) while those pixels near the center (corresponding to the pupil of the eye) are identified with a 1.

It should be noted that binary maps 24 and 34 may be only simplified versions of the actual pixel maps of associated boxes that delimit eye red-eye artifacts. In some embodiments, a binary map associated with a red-eye artifact may include many thousands (or more) pixels. It should also be noted that although boxes 22 and 32 are shown to be rectangular in shape, nothing prevents the use of alternative shapes that might encompass red-eye artifacts. These shapes may include trapezoids, triangles, octagons, or even conic sections such as circles, ellipses, and so forth.

FIG. 4 shows the result of modifying or rescaling binary map 24 to create a map with entries that correspond to pixels in a differently-sized, possibly larger version of the image than the version of the image used for detecting artifacts. It can be assumed that binary map 34 can also be modified or resealed in a similar manner, although the modified version of map 34 is not shown in FIG. 4. Further, when the resealed mask is used, for the first time, it is likely that the region delimited by the square box encompassing the mask is expanded to encompass a larger number of pixels based on the particular needs of the application.

In pseudocode, the modifying (or rescaling) operation performed on binary map 24 to create binary map 26 might be expressed below in which identifiers such as "$\min_{list^a{}_{det}}$" and "$\max_{list^a{}_{det}}$" indicate the minimum or maximum coordinates of the pixels where an artifact was found from the version of the image on which red-eye or other artifact detection was performed. As previously mentioned, the version from which red-eye or other artifact detection is performed might be as small as a thumbnail. In the first block (below), the maximum and minimum coordinates $(x_i, y_i)$ of the boxes (such as 22 and 32 of FIG. 2) in which the red-eye is detected are first determined.

Top Left X Coordinate in modified map (TLX)= $\min_{list^a{}_{det}}(x_i)$

Top Left Y Coordinate in modified map (TLY)= $\min_{list^a{}_{det}}(y_i)$

Bottom Right X Coordinate in modified map (BRX)= $\max_{list^a{}_{det}}(x_i)$

Bottom Right Y Coordinate in modified map (BRY)= $\max_{list^a{}_{det}}(y_i)$

In the pseudocode shown in the following paragraph, each pixel from the original binary map (such as binary maps 24 and 34) is remapped to locations in the modified binary map. In the following, the operation "round" indicates rounding a floating-point number to the nearest integer. The subscript "det" indicates a quantity associated with the image in which red-eye was originally detected. The subscript "mod" indicates a quantity associated with a differently-sized image and subsequently, the modified binary map.

for    Y=round(TLY*height$_{mod}$/height$_{det}$): round (BRY*height$_{mod}$/height$_{det}$)

$y_i$=round(Y*height$_{det}$/height$_{mod}$)

for    X=round(TLX*width$_{mod}$/width$_{det}$): round (BRX*width$_{mod}$/width$_{det}$)

$x_j$=round(X*width$_{det}$/width$_{mod}$)

if $(x_j,y_j)$ is in list$_{det}^a$ add (X,Y) to list$_{mod}^a$

FIG. 5 is a top-level functional block diagram for generating a luminance mask ($M_{lum}$) beginning with the modified binary map shown in FIG. 4 according to an embodiment of the invention. In FIG. 5, modified binary map 26 is input to luminance mask generator 60 and chrominance mask generator 70. Both luminance and chrominance mask generators (60, 70) make use of the pixels in the original (native format) of image 55. After both the luminance and chrominance masks are generated, the corrections are applied to the detected artifact.

As a first of operation of luminance mask generator 60, the luminance masks first initialized to contain binary values, then is "smeared" (or blurred) to expand and to soften the boundaries of the map. Thus, in the event that the modifying (or rescaling) of the binary map introduces errors in the process of relocating pixels from map 24 to 26 (for example), the smearing of the boundary of the modified binary map helps to ensure that pixels in need of correction that are located at the edge or slightly outside of the boundary receive at least a minimum level of correction. Further, the smearing operation reduces the appearance of abrupt changes between blocks of pixels in need of correction and blocks of pixels that do not need correction.

In one embodiment of the invention, initializing the luminance mask ($M_{lum}$) proceeds along the lines of the following pseudocode, which operates on the modified binary map. Accordingly, Top Left X Coordinate in resealed map (TLX)= $\min_{list^a{}_{mod}}(x_i)$ Top Left Y Coordinate in resealed map (TLY)= $\min_{list^a{}_{mod}}(y_i)$ Bottom Right X Coordinate in resealed map (BRX)= $\max_{list^a{}_{mod}}(x_i)$ Bottom Right Y Coordinate in resealed map (BRY)= $\max_{list^a{}_{mod}}(y_i)$ In the above pseudocode, the identifiers "$\min_{list^a{}_{mod}}$" and "$\max_{list^a{}_{mod}}$" indicate the minimum or maximum of the pixels at correction region locations $(x_i,y_i)$ from the version of the image that has been modified (or resealed). Continuing with the initialization of the luminance mask ($M_{lum}$),

```
for y = TLY – Δ_init : BRY + Δ_init
    for x = TLX – Δ_init : BRX + Δ_init
        if (x,y) is in list_corr a
            set M_lum(x-TLX– Δ_init,y-TLY– Δ_init) *= 1.0
        else
            set M_lum(x-TLX– Δ_init,y-TLY– Δ_init) *= 0.0
        end
    end
end
```

In an embodiment of the invention in which excellent performance has been observed, $\Delta_{init}$ is set equal to (BRX−TLX)*⅔.

After the luminance mask has been initialized, the smearing operation is implemented using a two-dimensional convolutional operator that computes the moving average of the pixels corresponding to the entries of the modified binary map. In one embodiment, the two-dimensional convolutional operator is separable in the x and y dimensions. In other embodiments of the invention, a coefficient vector of larger or smaller values may be used in the convolutional filtering operation. Additionally, other weighted moving-average filtering techniques such as a two-dimensional Gaussian filter or any other moving-average filtering technique that serves to blur the edges of the rescaled binary mask may be used.

As it pertains to the filter coefficients for $h_{ma}^0$ and $h_{ma}^1$ (which will be mentioned hereinafter), the following expressions have been used to calculate coefficient values for the filters based on the dimensions of the particular artifact being corrected:

$L_{lum}$=max(2*floor(sqrt([artifact width]×[artifact height])/64)+1,3), in which $h_{ma}^0$ and $h_{ma}^1$ are both $L_{lum} \times L_{lum}$ (square) moving average filters.

Thus, for the example mentioned hereinabove in which the convolutional operator is separable in the X and Y dimensions and in which $L_{lum}$=3, the coefficients for the square moving average filter($h_{ma}^0$) could be expressed in a 3×3 matrix as:

[ .11 .11 .11 ]

[ .11 .11 .11 ]

[ .11 .11 .11 ]

The above 3×3 matrix is equivalent to a separable 2-D convolutional operator having a coefficients vector of [0.3 0.3 0.3].

The values of the mask $M_{lum}$ that result from the smearing operation are then multiplied by the operators $S(x_i,y_i)$ and $P(x_i,y_i)$. In this embodiment, the operator $S(x_i,y_i)$ applies a different level of correction near the edge of the detected pupil (or other artifact) than at the center of the detected pupil (or other artifact). The attenuation factor $S(x_i,y_i)$ is of the form $C_s/(1+e^{(-2*(R_a-D_i))})$, in which the variable "$R_a$" is a measure of the distance of the radius of the pixel artifact, and in which $C_s$ is a constant. Typically, the values of $C_s$ in the range of [1, 2] yield good performance. In one embodiment, discussed in the remainder of this paragraph, $C_s$ is set to 1. The variable "$D_i$" is defined as the square root of the quantity $(x_i-x_{centroid})^2+(y_i-y_{centroid})^2$, in which the variables $x_{centroid}$ and $y_{centroid}$ represent an estimate of the x- and y-coordinates of the center of the red-eye artifact. Thus, at the center of the red-eye artifact, the quantity $e^{(-2*(Ra-Di))}$ approaches 1, implying a correction factor of approximately ½. Near the outer edges of the red-eye artifact, the quantity $e^{(-2*(Ra-Di))}$ approaches a large number, implying a correction factor that approaches 0. An advantage of the use of such an equation is that in the event that correction extends beyond the edge of the red-eye artifact, perhaps into the whiter portion of the eye, the reduction in luminance correction should be very slight, thus avoiding over darkening areas at or near the edge.

As previously mentioned, in addition to applying the attenuation factor of the form $C_s/(1+e^{(-2*(Ra-Di))})$ the luminance mask generator of FIG. 5 also applies a second-order statistical operator, $P(x_i,y_i)$. In this embodiment, $P(x_i,y_i)$ represents the likelihood of encountering the color at pixel location $(x_i,y_i)$ in the whole of the red-eye or other artifact. This operator is applied to create a luminance correction factor proportional to the redness of each pixel. The exemplary second-order statistical operator for each value of the luminance mask ($M_{lum}$) may be expressed as:

$$P(x_i,y_i)=\exp\{-z_i/(2(1-p_i))\},$$

in which $z_i=(a*(x_i,y_i)-\mu_{a*})2/\sigma_{a*}+2p(a*(x_i,y_i)-\mu_{a*})(b*(x_i,y_i)-\mu_{b*})/(\sigma_{a*}\sigma_{b}*)+(b*(x_i,y_i)-\mu_{b*})/2\sigma_{b*}$, and in which $p_i=\sigma_{a*b}*/(a*(x_i,y_i)b*(x_i,y_i))$ To enhance the readability of the above expression, the natural logarithm base "e" has been replaced by "exp", with the exponent of "e" being $\{-z_i/(2(1-p_i^2))\}$. Additionally, $a*(x_i,y_i)$ and $b*(x_i,y_i)$ represent components of the CIEL*a*b* color space at pixel location $x_i$ and $y_i$. Further, $\mu_{a*}$, $\mu_{b*}$, $\sigma_{a*}$, $\sigma_{b*}$ and $\sigma_{a*b*}$ represent the second order statistics of the values of a* and b* associated with the list of pixels in the modified coordinate map.

After the above-identified operations have been applied, $M_{lum}$ is further modified so that areas with high luminance values remain uncorrected. This operation can be characterized as "luminance thresholding" and has the result of preventing or at least reducing the likelihood of eye glint (or sparkle) from being darkened. To bring about this effect, the quantity $T_{lum}$ is used in the pseudocode below to indicate the luminance threshold of each pixel requiring correction in the modified binary map. In one embodiment, the 15% brightest pixels are not corrected while the remaining 85% of the of the luminance mask ($M_{lum}$) are corrected ($T_{lum}$ is set to a luminance value such 15% of all pixels are brighter than $T_{lum}$; those skilled in the art can recognize that this value may be determined by computing a histogram of luminance values). However, in other embodiments of the invention, the threshold may be set such that a higher percentage of pixels is corrected (such as 90%) with the top 10% brightest pixels not being corrected. In other embodiments of the invention, the threshold may be set such that a lower percentage of pixels is corrected (such as 80%) with the top 20% brightest pixels not being corrected. But regardless of the value chosen for $T_{lum}$, after initializing the mask the threshold in operation proceeds according to the following:

```
for all locations (x,y) in the mask M_lum
    if L(x,y) > T_lum
        set M_lum (x,y) = 0.0
    end
end
```

The completion of this operation, regardless of the method chosen, results in a "thresholded" luminance mask. In this embodiment, the use of a thresholded luminance mask specifies how light or dark the pixels in the corrected red-eye will be. After the thresholded luminance mask is determined, a two-dimensional convolutional operator is applied to the higher-luminance pixels. In this operation, the coefficient vector [0.3 0.4 0.3] is used to perform filtering in each dimension ($h_{lum}$ in FIG. 6). This filter choice is equivalent to defining $h_{lum}$ as follows:

$$\begin{bmatrix} .09 & .12 & .09 \\ .12 & .16 & .12 \\ .09 & .12 & .09 \end{bmatrix}$$

Next, the luminance thresholding procedure is repeated, followed by application of a moving average filter $h_{ma}^1$. In one embodiment, the second thresholding operation separates the 8% brightest pixels from the 92% least bright.

In another embodiment, a "glint-detection" routine is used to determine which pixels should be eliminated, or even whether a glint is present, as opposed to the two-pass approach described in the embodiment hereinabove. The same pseudocode for a single iteration can be used to do so, where $L(x,y)$ is replaced by a per-pixel metric $M_{glint}(x,y)$, and $T_{lum}$ is replaced by $T_{glint}$, a threshold that is more appropriate for use with $M_{glint}$. One such metric that can be used to do so is described in U.S. Pat. No. 7,155,058 "System and Method for Automatically Detecting and Correcting Red-Eye." $M_{glint}$ can be implemented as a moving-average-filtered version of the Laplacian operator applied to $L(x,y)$.

At this point, embodiments of the invention may consider the ratio of the perimeter of the overall image to the perimeter of the red-eye or other artifact (such as in the expression $D_{ratio}$=[Perimeter of image]/[Perimeter of artifact]). In one example, for those instances in which the perimeter of the red-eye artifact is much smaller than the perimeter of the image (such as might be encountered when a red-eye is present in the distant background of the captured image) more aggressive red-eye correction may be desirable. In contrast, for those instances in which the perimeter of the red-eye artifact is somewhat larger (such as might be encountered when a red-eye is present in the foreground of the captured image), less aggressive red-eye correction may be appropriate since the statistical and convolutional operators tend to provide predictable benefits when large numbers of pixels are available. To bring about appropriate levels of correction that take into account the relative size of the artifact, each entry in the thresholded luminance mask is raised to a power based on $D_{ratio}$. In this embodiment of the invention:

power_array=[0.25, 0.27, 0.30, 0.33] is an indexed array in which power_array[0]=0.25, power_array[1]=0.27, and so forth.

Further, the power chosen for a particular artifact is given by:

power_array[min(3,max(0,floor($D_{ratio}$/10−1)))]

Accordingly, when the perimeter of the artifact is much smaller than the perimeter of the image, $D_{ratio}$ assumes a large value. In turn, the "floor" function approaches the value of $D_{ratio}/10$ as does the "max" function. Thus, for this instance, the function for determining the chosen index for use with power_array returns a 3, which corresponds to the entry 0.33 in power_array. In turn, each entry of the thresholded luminance mask is raised to the indexed value of power_array, which in this case is 0.33. As $D_{ratio}$ assumes larger and smaller values, different entries of power_array are chosen.

In an embodiment of the invention that includes additional features that account for those instances in which red-eye artifacts are quite small when compared to the image ($D_{ratio}$ is large), acceptable results have been observed when $D_{ratio} > T_{ratio}$ where $T_{ratio}$ is approximately 35. However, in other embodiments, larger values for $T_{ratio}$ (such as 40 or 50) may be used. In still other embodiments, smaller values for $T_{ratio}$ (such as 20 or 25) may be used. The inventors contemplate that for those instances in which red-eye artifacts are quite small, pixel overcorrection (even for a small number of pixels) can noticeably reduce the overall quality of the image. In these instances, all luminance mask entries corresponding to 0 values in the modified binary map (such as modified binary map 26) used in the beginning stages of the generation of the luminance mask are held to 0 and remain uninfluenced by further averaging, convolving, or other operations.

Figure 6:
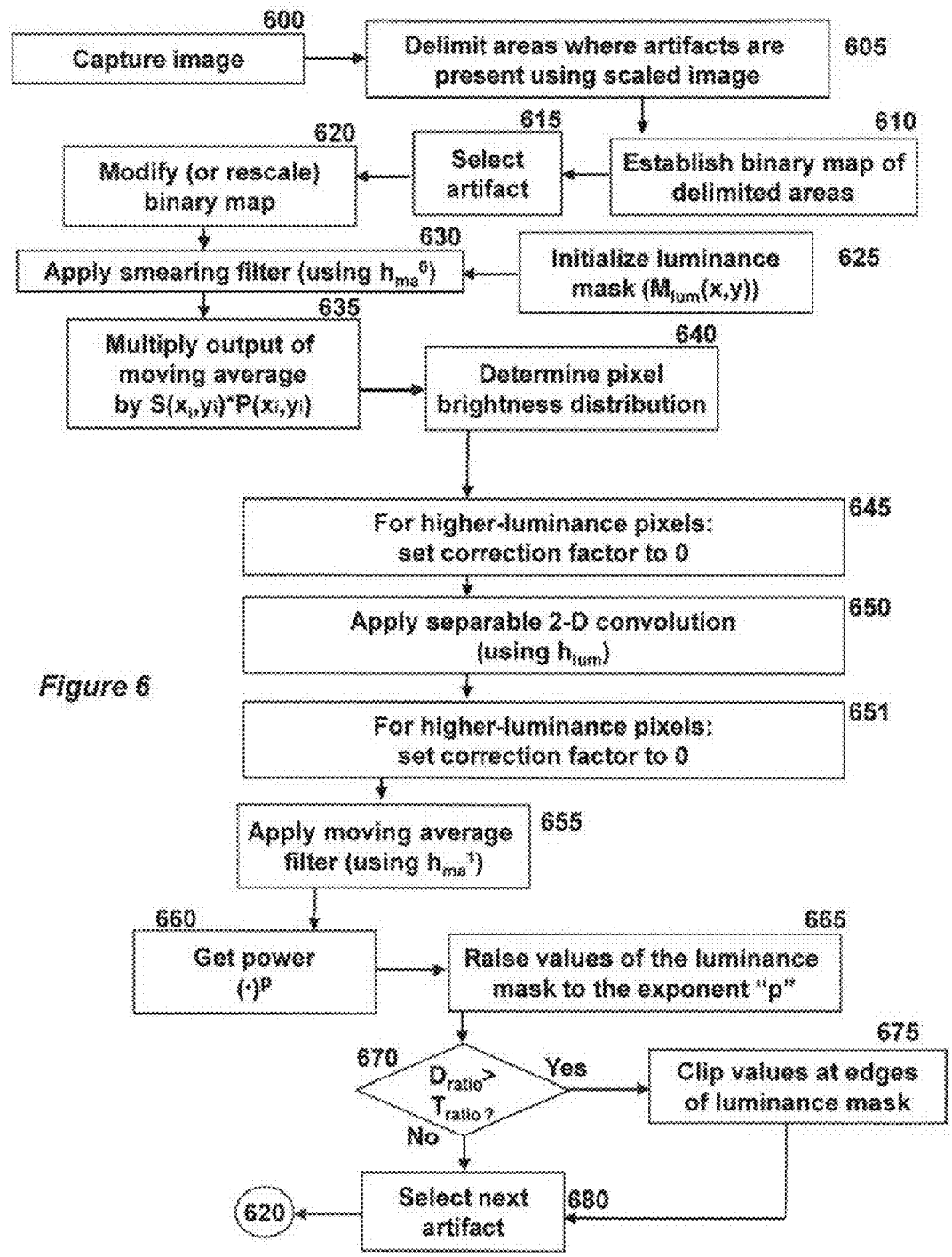
FIG. 6 is a flowchart that summarizes the operations in relation to preparing a luminance mask according to an embodiment of the invention.

FIG. 6 is a flowchart that summarizes the operations generating a luminance mask according to embodiment of the invention. The method of FIG. 6 begins at step 600 in which an image that includes red-eye or other artifacts is captured, perhaps by a digital camera or other digital imaging device. At step 605, the digital camera, other imaging device or possibly even a digital image manipulation service delimits one or more areas within which red-eye or other artifacts are present by possibly using a thumbnail representation or a possibly differently-sized version of the captured image. At step 610, the digital camera, other imaging device or digital image manipulation service establishes a binary map of the one or more delimited areas, referred to as correction regions. At step 515, a first artifact is selected for red-eye reduction.

At step 620, the binary map that delimits the location of the first selected artifact is modified such that the rescaled binary map corresponds to locations of pixels in the image in which correction is to be applied. As previously noted hereinabove, correction may be applied to a thumbnail or other differently-sized image, which may even be differently sized than the original image uploaded by the customer. The box encompassing the artifact (such as boxes 22 and 32 of FIG. 2) is modified to encompass a larger number of pixels, such as twice as many, four times as many, or may be modified according to any other multiple. At step 625, a luminance mask ($M_{lum}(x,y)$) is initialized and, at step 630, a smearing, filter is applied to the modified binary map inserted into the initialized luminance mask. The method continues at step 635 in which the result of step 630 is multiplied by an attenuation factor ($S(x_i,y_i)$) in which areas near the edges of the modified binary map receive less correction than the areas near the center of the modified binary map. Step 635 also includes multiplying the result of step 630 by a statistical operator $P(x_i,y_i)$ that represents the likelihood of encountering the color at pixel ($x_i,y_i$) in the remainder of the red-eye or other artifact.

At step 640, the distribution of lowest to highest luminance pixels (such as might be expressed by way of a histogram) at the output of step 635 is determined. In one embodiment, the method continues at step 645, which includes the separation of the 15% highest-luminance pixels from the remaining 85% (lower-luminance). In this step, the correction factor for the higher luminance pixels is set to 0. A separable two-dimensional convolutional filter is applied at step 650 to smooth the luminance mask. Step 651 then repeats a version of the process applied in step 645, where the correction factor for the higher luminance pixels is set to 0. At step 655, a different moving average filter is applied.

Step 660 includes determining an exponent to which the nonzero elements of the luminance mask should be raised for optimal performance. At step 665, the exponential operator determined at step 660 is applied to the nonzero elements of the luminance mask. The method continues at step 670 in which a determination is made as to whether $D_{ratio} > T_{ratio}$. In the event that $D_{ratio} > T_{ratio}$, indicating that the size of the artifact is small in relation to the size of the overall image, step 675 is performed in which any correction values for pixels extending into the regions of the luminance mask map occupied by 0 values are set to 0. As previously discussed, this step can be useful for treating relatively small red-eye or other artifacts in which overcorrection can reduce the quality of the image. In the event that $D_{ratio}$ is not greater than $T_{ratio}$ step 680 is performed in which the next artifact is selected for correction. The method returns to step 620.

Having discussed the development of the luminance masks, the generation of the chrominance mask can now be discussed. In general terms, because the human visual system is less sensitive to changes in chrominance than to changes in luminance, the development of the chrominance mask that aids in the correction of red-eye and other artifacts (by way of color correction) is less complicated than the development of the luminance mask.

The development of chrominance mask generator 70 (of FIG. 4) begins with a modified binary map (such as modified binary map 26 of FIG. 4) and the initialization of the chrominance mask. After the initialization of the mask, the nonzero entries in the mask are set to the probability of finding another pixel with the same luminance in the mask. The boundaries of the mask are then expanded based on the relationship between pixel luminance along profiles extending away from the pixels at the edge of the mask. The following pseudocode can be used to express this operation:

```
For each boundary pixel at (x_i,y_i),
    initialize Δx, Δy to represent a vector pointing away from
 the artifact center
    set L_anchor = L(x_i,y_i)
    while abs(L_anchor − L(x_i,y_i))/L_anchor ≥ R_tol
        x_i += Δx, y_i += Δy
        M_chrom( round(x_i), round(y_i)) = M_expand
    end
end
```

In the above pseudocode, the variable $L_{anchor}$ represents the luminance of a pixel at the edge of the existing (unexpanded) chrominance mask (i.e. an anchor pixel). In one embodiment of the invention, the value for $R_{tol}$ is the average value of non-zero entries in the mask determined up to this point. In another embodiment of the invention, $R_{tol}$ is set to larger values for larger artifacts and smaller values for smaller artifacts. Thus, in an embodiment in which both sides of the bounding box that encompass the artifact are greater than 46 pixels, a value for $R_{tol}$ of 0.15 may be used. For artifacts in which both sides of the bounding box that encompass the artifact is less than 23 pixels, a value for $R_{tol}$ of 0.05 may be used. For those artifacts for which a minimum side of the bounding box that encompasses the artifact is between 23 and 46 pixels, a linear interpolation between 0.05 and 0.15 may be used. The inventors have also determined that acceptable results are achieved when $M_{expand}$ is approximately 0.2. Further, the quantities $\Delta x$ and $\Delta y$ are drawn in the range $[-1,1]$.

After the chrominance mask has been expanded, the mask is "thresholded", in binary form. In the thresholding operation, if the chrominance value at a particular location in the artifact is greater than a particular value ($T_{chrom}$) the chrominance at the specified location is identified as still needing correction. If the chrominance mask at the particular location in the artifact is not greater than $T_{chrom}$, the chrominance value of the pixel at that location is identified as not requiring correction.

The following pseudocode that operates on the chrominance mask (derived from modified binary map 26 of FIG. 4) can be used to bring about this thresholding process:

```
TLX = min list^a_mod(x_i)
TLY = max list^a_mod(y_i)
BRX = min list^a_mod(x_i)
BRY = max list^a_mod(y_i)
for y = TLY-Δ_init : BRY+Δ_init
    for x = TLX-Δ_init : BRX+Δ_init
        if M_chrom(x-TLX- Δ_init,y-TLY- Δ_init) > T_chrom
            set M_chrom (x-TLX- Δ_init,y-TLY- Δ_init) = 1.0
        else
            set M_chrom(x-TLX- Δ_init,y-TLY- Δ_init) = 0
        end
    end
end
```

In which the above variables TLX, TLY, BRX, and BRY correspond to the top-left-most (minimum) and bottom-/right-most (maximum) pixel coordinates associated with the correction region The re-binarized mask is then filtered by way of a moving average filter using coefficients ($h_{ma}^2$). To calculate the coefficients of the two dimensional matrix $h_{ma}^2$, which serves to smooth the boundary between corrected and uncorrected pixels, the following expression first assumes a value of 16 for $d_{chrom}$ and then adjusts this value upward for artifacts having a relatively small height or width dimension.

```
d_chrom = 16;
if min([artifact width],[artifact height])<20
    d_chrom = d_chrom+max(0,d_chrom -16);
end
L_chrom = 2*floor(([artifact width]*[artifact height])/(2*d_chrom)+1)
and h_ma^2 is an L_chrom × L_chrom (square) moving average filter
```

FIG. 7 is a flow chart for a method that summarizes the development of the chrominance mask according to an embodiment of the invention. The method of FIG. 7 begins with steps 600, 605, 610, 615, and 620, each of which has been described previously in reference to FIG. 6. At step 700, which represents a departure from the method of FIG. 6, all nonzero entries in the chrominance mask (initialized at step 705) are set to the probability of finding another pixel with the same luminance in the mask. At step 710, the boundaries of the mask are expanded based on the relationship between pixel luminance along profiles extending away from the pixels at or near the edge of the chrominance mask.

At step 720, the expanded chrominance mask is thresholded in binary form. In the thresholding operation, chrominance values (from $M_{chrom}$) greater than a predetermined amount are designated for chrominance correction, otherwise no correction is applied. At step 725, a moving average filter that functions to taper the boundaries between corrected and uncorrected pixels is applied to the re-binarized (thresholded) chrominance mask resulting from step 720. At step 730, the next red-eye artifact requiring chrominance correction is selected. The method then returns to step 620 using the next artifact.

Returning now to FIG. 5 the generated luminance and chrominance masks can now be applied to a captured image converted from the color space output of the raw sensor to a luminance and chrominance space (75). Candidate luminance and chrominance spaces include YCbCr and CIEL*a*b*. In one embodiment, the luminance mask values specify the attenuation factors to be applied to the corresponding luminance values, and chrominance mask values specifies the fraction of attenuation towards a neutral hue (gray) to be applied to the corresponding chrominance values.

Although described hereinabove as methods, embodiments of the invention can be performed in any one of many computer processing, including Internet-based computing networks, multi-processor computer systems, and by way of logic modules embedded in handheld or personal computer systems.

In conclusion, while the present invention has been particularly shown and described with reference to various embodiments, those skilled in the art will understand that many variations may be made therein without departing from the spirit and scope of the invention as defined in the following claims. This description of the invention should be understood to include the novel and non-obvious combinations of elements described herein, and claims may be presented in this or a later application to any novel and non-obvious combination of these elements. The foregoing embodiments are illustrative, and no single feature or element is essential to all possible combinations that may be claimed in this or a later application. Where the claims recite "a" or "a first" element or the equivalent thereof, such claims should be understood to include incorporation of one or more such elements, neither requiring nor excluding two or more such elements.

What is claimed is:

1. A method of correcting an artifact in a captured image, comprising:
   generating, by a computing device, a binary map corresponding to the artifact in the captured image;
   generating, by the computing device, a luminance mask from the binary map, the luminance mask applying a level of correction near an edge of the artifact that is different from a level of correction applied at the center of the artifact;
   generating, by the computing device, a chrominance mask to correct a color of the artifact, and
   performing, by the computing device, corrections to pixels according to the luminance and the chrominance masks.

2. The method of claim 1, additionally comprising, after the step of generating a binary map, the step of modifying a boundary of the luminance mask, wherein the boundary delimits pixels that need correction from pixels that do not need correction.

3. The method of claim 1, wherein the step of generating a luminance mask includes using a convolutional operator that blurs a boundary of the binary map.

4. The method of claim 1, wherein the step of generating a luminance mask includes applying an operator that represents a likelihood of encountering a color at a pixel location in the whole of a red-eye or other artifact.

5. The method of claim 1, wherein the step of generating a luminance mask step is performed on a larger-sized version of the captured image.

6. The method of claim 1, wherein the step of generating a luminance mask further comprises the step of thresholding pixel values of the artifact that reduces a likelihood of eye glint being darkened.

7. The method of claim 1, wherein the step of generating a luminance mask further comprises the step of applying a moving-average filtering technique to blur edges of the binary map.

8. The method of claim 1, wherein the step of generating the chrominance mask includes expanding boundaries of the chrominance mask based on a relationship between pixel luminance along a profile extending away from pixels at the edge of the chrominance mask.

9. The method of claim 8, further comprising expanding the chrominance mask based on the relationship between pixel luminance as the chrominance mask extends away from an anchor pixel towards an edge of the chrominance mask.

10. An apparatus for correcting an artifact in a captured image, comprising:
   means for generating a binary map corresponding to the artifact in the captured image, the binary map including locations in the artifact that need correction and locations in the artifact that do not need correction; and
   means for generating a luminance mask and a chrominance mask, wherein
   the means for generating a luminance mask includes applying a level of correction near an edge of the artifact that is different from a level of correction applied at the center of the artifact.

11. The apparatus of claim 10, wherein the means for generating a luminance mask includes means for multiplying the binary map by a value pertaining to a likelihood of detecting one of a plurality of pixels in the whole artifact having a same chrominance as the one of the plurality of pixels.

12. The apparatus of claim 10, wherein the means for generating a luminance mask includes means for determining pixels for which I glint has occurred.

13. The apparatus of claim 10, wherein the means for generating a luminance mask includes means for raising values of the binary map to a power that is determined based on a size of the artifact and a size of the captured image.

14. A The apparatus of claim 10, wherein the means for generating a chrominance mask includes means for multiplying values of chrominance at a location of the chrominance mask with a value pertaining to the likelihood of detecting other pixels in the chrominance mask having similar brightness.

15. The apparatus of claim 14, wherein the means for generating a chrominance mask includes means for smoothing a boundary between corrected and uncorrected pixels.

* * * * *

UNITED STATES PATENT AND TRADEMARK OFFICE
CERTIFICATE OF CORRECTION

PATENT NO.       : 8,655,100 B2
APPLICATION NO.  : 13/260292
DATED            : February 18, 2014
INVENTOR(S)      : Matthew Gaubatz et al.

It is certified that error appears in the above-identified patent and that said Letters Patent is hereby corrected as shown below:

In the Claims:

In column 12, line 12, in Claim 12, delete "I" and insert -- eye --, therefor.

In column 12, line 18, in Claim 14, delete "A The" and insert -- The --, therefor.

Signed and Sealed this
Third Day of June, 2014

Michelle K. Lee
*Deputy Director of the United States Patent and Trademark Office*